US008619756B2

(12) United States Patent
Das et al.

(10) Patent No.: US 8,619,756 B2
(45) Date of Patent: Dec. 31, 2013

(54) SYSTEMS AND METHODS FOR PROVIDING RESOURCE ALLOCATION MEETING COMMUNICATION CONSTRAINTS FOR MULTI-HOP NETWORK DATA FLOWS

(75) Inventors: Soumya Das, San Diego, CA (US); Krishnan Rajamani, San Diego, CA (US); Samir S Soliman, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 548 days.

(21) Appl. No.: 12/638,193

(22) Filed: Dec. 15, 2009

(65) Prior Publication Data

US 2011/0013644 A1   Jan. 20, 2011

Related U.S. Application Data

(60) Provisional application No. 61/225,599, filed on Jul. 15, 2009.

(51) Int. Cl.
*H04L 12/28* (2006.01)

(52) U.S. Cl.
USPC ........................................................ 370/351

(58) Field of Classification Search
USPC .................. 370/351, 355, 356, 389, 400; 709/238–243
See application file for complete search history.

(56) References Cited

U.S. PATENT DOCUMENTS

| 6,665,301 | B1 * | 12/2003 | Wu | 370/395.41 |
| 7,106,703 | B1 | 9/2006 | Belcea | |
| 7,339,897 | B2 * | 3/2008 | Larsson et al. | 370/252 |
| 7,570,593 | B1 * | 8/2009 | ElBatt et al. | 370/238 |

(Continued)

FOREIGN PATENT DOCUMENTS

| GB | 2409600 | 6/2005 |
| JP | 2005531173 T | 10/2005 |

(Continued)

OTHER PUBLICATIONS

Crawley E et al: "RFC 2386: A Framework for QoS-based Routing in the Internet" Internet Citation, [Online] Nov. 4, 2002, XP002219363 Retrieved from the Internet: URL:ftp://ftp.isi.edu/in-notes/rfC2386.txt > [retrieved on Nov. 4, 2002] the whole document.

(Continued)

*Primary Examiner* — Dmitry H Levitan

(74) *Attorney, Agent, or Firm* — QUALCOMM IP Department; James Hunt Yancey, Jr.

(57) ABSTRACT

Systems and methods identify a multi-hop network data path with sufficient available resources at each node along the data path to facilitate desired end-to-end data flow. Embodiments operate to identify resource constraints for meeting QoS or other communication requirements at each node of a multi-hop data path and propagate the resource constraint information within the network for use in identifying data paths suitable for supporting a desired end-to-end data flow. A resource allocation algorithm operable to allocate resources to achieve an end-to-end data flow meeting the communication requirements is implemented according to embodiments. A resource allocation algorithm of embodiments operates to ensure efficient use of the available resources so that desired conditions are satisfied when the resource requirements are met at each intermediate node for the upstream and downstream links and also both links simultaneously.

27 Claims, 6 Drawing Sheets

(56) References Cited

U.S. PATENT DOCUMENTS

| | | | |
|---|---|---|---|
| 7,660,285 B2 * | 2/2010 | Xiong et al. | 370/338 |
| 7,773,569 B2 * | 8/2010 | Belcea | 370/338 |
| 7,813,373 B2 * | 10/2010 | Joshi et al. | 370/458 |
| 7,929,546 B2 * | 4/2011 | Joshi et al. | 370/395.4 |
| 8,040,857 B2 * | 10/2011 | Wang et al. | 370/337 |
| 8,089,884 B2 * | 1/2012 | Liu | 370/237 |
| 8,170,567 B2 * | 5/2012 | Cai et al. | 455/450 |
| 2007/0058664 A1 | 3/2007 | Kim et al. | |
| 2011/0013572 A1 | 1/2011 | Huang et al. | |

FOREIGN PATENT DOCUMENTS

| | | |
|---|---|---|
| WO | WO0039967 | 7/2000 |
| WO | 03098816 A2 | 11/2003 |
| WO | 2007149659 A1 | 12/2007 |
| WO | WO2008005938 | 1/2008 |
| WO | WO2008070871 | 6/2008 |
| WO | WO2009065958 | 5/2009 |

OTHER PUBLICATIONS

International Search Report and Written Opinion—PCT/US2010/042162, International Search Authority—European Patent Office—Dec. 10, 2010.

Tajima S., et al., "Link Operation Scheduling Algorithm for Avoiding Interference in Ad-hoc Network," Proceedings of 2004 DICOMO Symposium (IPSJ Symposium Series, vol. 2004, No. 7), The Information Processing Society of Japan, Jul. 7, 2004, pp. 309-312, ISSN: 1344-0640.

Taki H., et al., "Ubiquitous Computing and its Application -Information Technology Popularized in Society and Home-," 1st ed., The Institute of Electrical Engineers of Japan, Sep. 30, 2008, pp. 31-34, ISBN: 978-4-88686-268-6.

Taiwan Search Report—TW099123313—TIPO—Jul. 3, 2013.

Kangawa, T., "Multi-cell Scheduling for QoS Control in CDMA/TDD Systems," Technical Report of the Institute of Electronics, Information and Communication Engineers, vol. 104, No. 681 (MoMuC 2004-107 to 148), The Institute of Electronics, Information and Communication Engineers, Feb. 23, 2005: 83-88, ISSN: 0913-5685.

Saito K., et al., "The time slot assignment method considering the interference among the communication flows for TDMA-based bandwidth reservation in wireless mesh networks," Technical Report of the Institute of Electronics, Information and Communication Engineers, vol. 106, No. 358 (IN2006-89 to 113), The Institute of Electronics, Information and Communication Engineers, Nov. 9, 2006: 91-96, ISSN: 0913-5685.

Decision of Rejection—Japanese Patent Application No. 2012-520790; Mailed Aug. 20, 2013.

Translation of Decision of Rejection—Japanese Patent Application No. 2012-520790; Mailed Aug. 20, 2013.

* cited by examiner

SYSTEMS AND METHODS FOR PROVIDING RESOURCE ALLOCATION MEETING COMMUNICATION CONSTRAINTS FOR MULTI-HOP NETWORK DATA FLOWS

CLAIM OF PRIORITY UNDER 35 U.S.C. §119

The present application for patent claims the benefit of U.S. provisional patent application No. 61/225,599 entitled "Slot Allocation at Nodes for Meeting Quality of Service Constraints in Multihop Ultra Wideband Networks and Resource Allocation and Scheduling with Quality of Service and Fairness Requirements in TDMA Based Multihop Wireless Networks," filed Jul. 15, 2009, and assigned to the assignee hereof, the disclosure of which is hereby expressly incorporated herein by reference.

BACKGROUND

1. Field

The disclosure relates generally to network communication and, more particularly, to resource allocation for network communication.

2. Background

Information communication provided by various forms of networks has nearly become ubiquitous in the world today. Networks comprised of a plurality of nodes in communication using wireless and wireline links are used, for example, to carry data packets which may convey many types of data payload, such as voice data, multimedia data, alphanumeric data, graphics data, etc. Accordingly, the nodes of such networks may comprise computers, personal digital assistants (PDAs), phones, servers, routers, switches, multiplexers, modems, radios, access points, base stations, etc. Data packet flows are established between the network nodes to provide desired network communication, wherein the end-to-end data communication for any particular communication session may utilize multiple hops (i.e., be routed through one or more intermediate network node). Any number of the network nodes may be contending for network communication resources for providing such flows at any particular point in time.

A transmission between a pair of network nodes (e.g., wireless network nodes) may cause interference with respect to communications of one or more other network node (e.g., interfere with another transmission between a different pair of network nodes), if these transmissions overlap in time, frequency, and space domains. Hence, the success of such transmissions might only be ensured if they are separated in at least one of the aforementioned domains. A number of techniques for providing resource allocation for shared access to the network communication links may be implemented to facilitate network communications, such as frequency division multiple access (FDMA), time division multiple access (TDMA), spatial separation/isolation, etc. In a TDMA system in which the frequency domain is not utilized for providing communication orthogonality, for example, time and space domains may be explored with respect to different transmissions in providing resource allocation for avoiding communication contention (e.g., TDMA operations and spatial reuse options explored for interference avoidance).

Providing allocation of resources (e.g., allocation of time slots and/or data path routing in the aforementioned TDMA system example) for facilitating network communications is generally not as simple as determining if sufficient data capacity is available for use in communicating a particular node's data in any one network link. The applications for which data communication is provided (e.g., streaming and/or high definition multimedia services in WiMedia based ultra-wideband (UWB) networks, see ECMA-368, "High Rate Ultra Wideband PHY and MAC Standard," $2^{nd}$ Edition, December 2007, incorporated herein by reference) may be bandwidth intensive and delay sensitive and thus have strict quality of service (QoS) requirements. Accordingly, a data path with sufficient available resources at each node along the data path is needed to support QoS requirements of a data flow over multiple hops of a network to guarantee QoS over the end-to-end data path.

Previous solutions have proposed TDMA scheduling schemes that are centralized implementations which are not suitable for distributed media access control (MAC) protocols, such as those of WiMedia based UWB networks. Some such previous solutions are variants of QoS aware routing protocols, while other such previous solutions have used integer linear programming in an attempt to solve the problem of supporting a desired flow.

SUMMARY

The present disclosure is directed to systems and methods which identify a multi-hop network data path with sufficient available resources at each node along the data path to facilitate desired end-to-end communications (end-to-end data flow). Embodiments operate to identify resource constraints for meeting QoS or other communication requirements at each node of a multi-hop data path. Accordingly, embodiments of the disclosure determine whether the resource availabilities at each node of an end-to-end data path are able to meet the communication requirements of an end-to-end data flow. In a TDMA system configuration, for example, communication requirements such as QoS requirements may dictate minimum throughput metrics resulting in time slot (resource) constraints to be imposed with respect to each node used in a particular multi-hop data path. Operation according to embodiments of the disclosure identifies a multi-hop data path with sufficient available time slots at each node along the data path to accommodate the end-to-end data flow.

Embodiments of the disclosure operate in a distributed way to determine whether the resource availabilities at each node of an end-to-end data path are able to meet the communication requirements of an end-to-end data flow. Accordingly, embodiments propagate resource constraint information, such as QoS information, within the network for use in identifying data paths suitable for supporting a desired end-to-end data flow. Such embodiments are suitable for use with respect to distributed MAC protocols, such as those of WiMedia based UWB networks.

Multi-hop data communication links include one or more intermediate network node which utilize corresponding upstream and downstream links to complete the end-to-end data path. In some cases, the resource requirements may not be met for the upstream link or downstream link at each intermediate node or for the upstream link and downstream link simultaneously. Such scenarios provide a data path which is identified as not supporting a desired end-to-end data flow according to embodiments of the disclosure. In other cases, the resource requirements are met at each intermediate node for the upstream and downstream links and also both links simultaneously, although arbitrary resource allocation between the upstream and downstream links at each intermediate node may not satisfy QoS or other communication requirements of the links. Accordingly, embodiments of the disclosure include a resource allocation algorithm operable to allocate resources to achieve an end-to-end data flow meeting the communication requirements. A resource allocation algorithm of embodiments operates to ensure efficient use of the available resources so that desired conditions are satisfied when the resource requirements are met at each intermediate node for the upstream and downstream links and also both links simultaneously.

For example, all intermediate nodes of an end-to-end data path are determined to have sufficient resource availability for a desired end-to-end data flow in a TDMA system configuration, and thus the data path may be identified as supporting the desired end-to-end flow. However, arbitrary assignment of time slots in the upstream and downstream links associated with these intermediate nodes may result in communication requirements not being met. A time slot allocation algorithm of embodiments of the disclosure may thus operate to allocate time slots to achieve end-to-end data flow meeting the communication requirements.

Embodiments of the disclosure are utilized in association with, or as part of, a communication requirements aware routing protocol, such as a QoS aware routing protocol. Accordingly, embodiments of the disclosure may operate to determine a best available end-to-end data path where multiple data paths satisfy the resource constraints or other communication requirements.

The foregoing has outlined rather broadly the features and technical advantages of the present disclosure in order that the detailed description of the disclosure that follows may be better understood. Additional features and advantages of the disclosure will be described hereinafter which form the subject of the claims. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the disclosure as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWING

For a more complete understanding of the present disclosure, reference is now made to the following descriptions taken in conjunction with the accompanying drawings, in which.

DETAILED DESCRIPTION

To aid in understanding the concepts of the present disclosure, embodiments are described below with reference to WiMedia based UWB network configurations, WiMedia MAC, and/or TDMA system configurations. It shall be appreciated, however, that the concepts herein are applicable to various network configurations, protocols, and resource allocation techniques. For example, embodiments of the present disclosure may be provided with respect to any distributed TDMA MAC.

Figure 1:
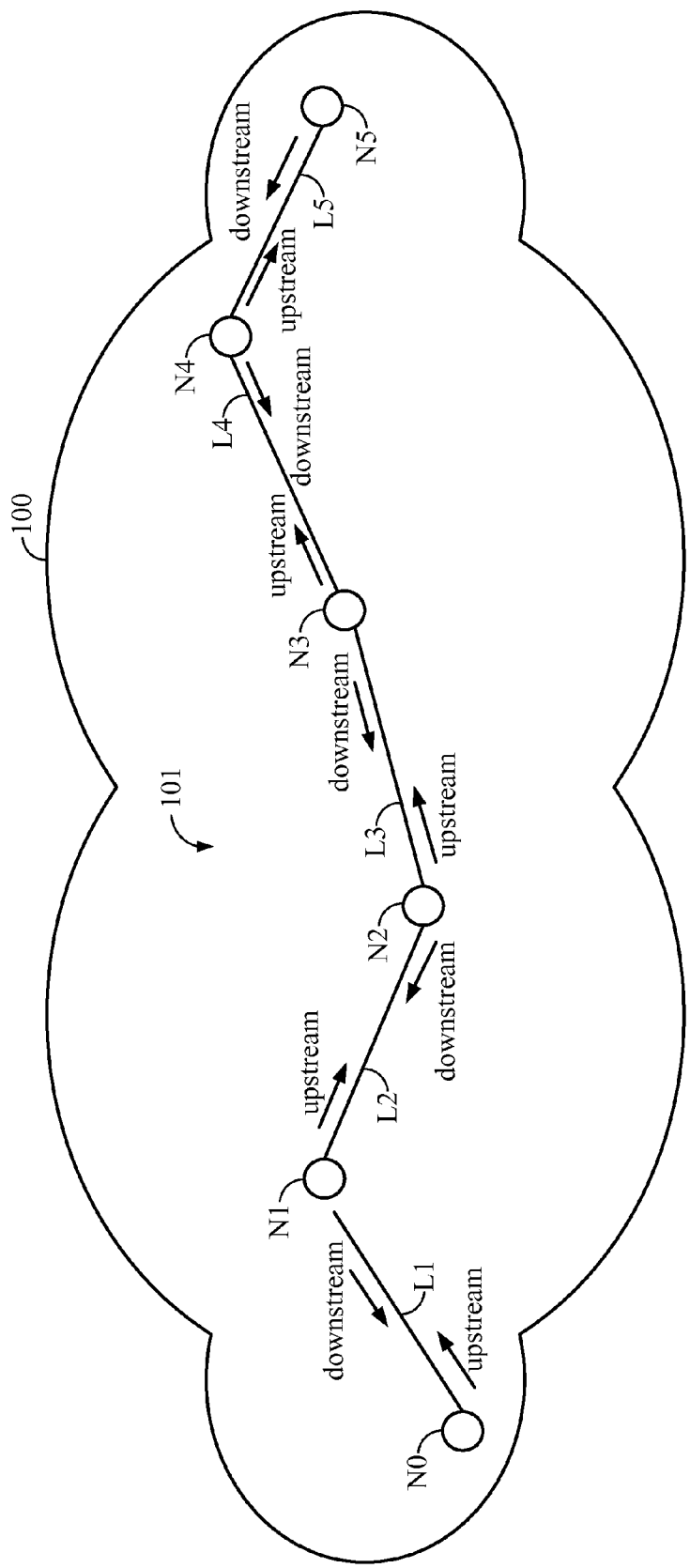
FIG. 1 shows a schematic of a network adapted for operation according to embodiments of the disclosure.

FIG. 1 shows a simplified schematic of network 100 adapted for operation according to embodiments of the disclosure. Network 100 may comprise various network configurations, such as a personal area network (PAN), a local area network (LAN), metropolitan area network (MAN), a wide area network (WAN), an intranet, an extranet, the Internet, a wireless network, a wireline network, etc. Network 100 of the illustrated embodiment includes network portion 101 comprised of network nodes N0-N5 in communication via links L1-L5. Network nodes N0-N5 may have the same or different node configurations, such as may comprise various ones of computers, personal digital assistants (PDAs), phones, servers, routers, gateways, switches, multiplexers, modems, radios, access points, base stations, etc. Network links L1-L5 may utilize various media, such as copper wire, fiber optic line, air interface (e.g., radio frequency, infra-red, etc.), and/or the like. Thus, links L1-L5 may comprise wireline links, wireless links, and combinations thereof.

Assuming network node N0 is in data communication with network node N5, an end-to-end data path is provided by links L1-L5. Thus the resulting end-to-end data flow is a multi-hop data flow. Network nodes N1-N4 comprise intermediate network nodes in the foregoing multi-hop data flow.

Although particular links are shown providing an end-to-end data path, it should be appreciated that other links and/or end-to-end data paths may be provided in the network represented. For example, various additional links of network 100 (not shown) may be available between certain ones of the network nodes, such as between network nodes N0 and N2, N1 and N3, N3 and N5, etc. Moreover, various additional network nodes (not shown) may be present in network 100 which may be utilized to provide additional links (also not shown). However, a single end-to-end data path is shown with respect to network nodes N0 and N5 in FIG. 1 in order to simplify the discussion of the concepts herein.

Figure 2:
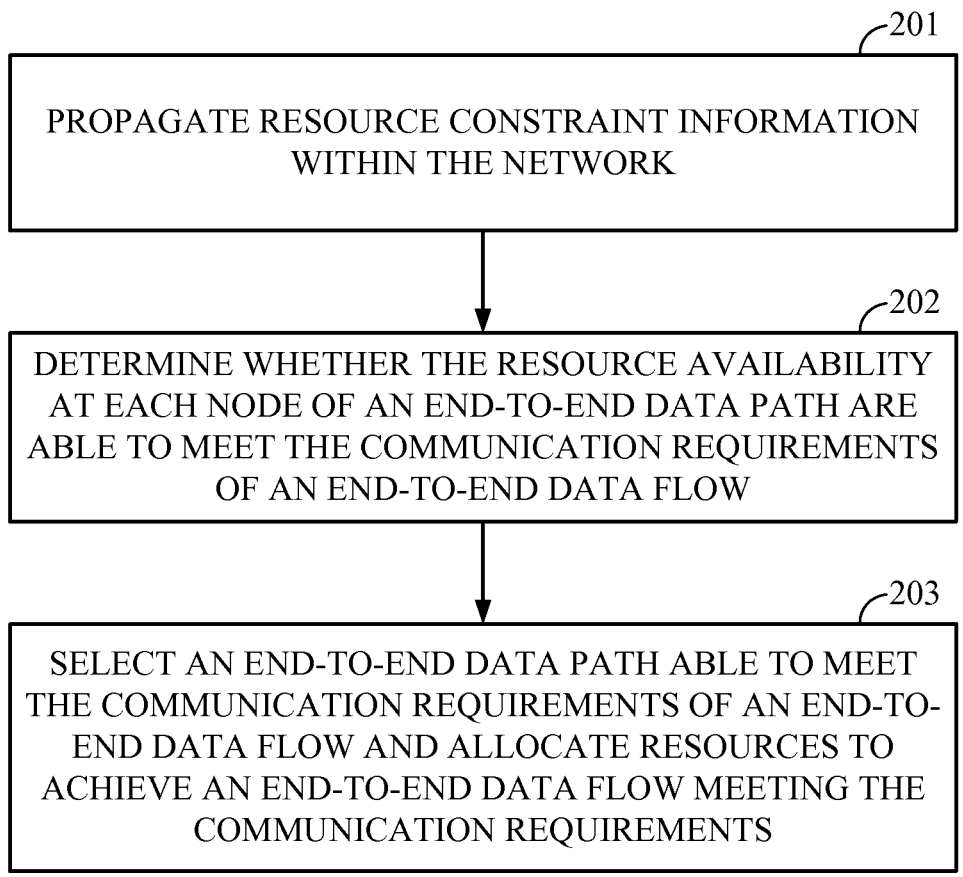
FIG. 2 shows a high level flow diagram of operation to identify a multi-hop network data path with sufficient available resources at each node along the data path to facilitate a desired end-to-end data flow according to an embodiment of the disclosure.

FIG. 2 shows a high level flow diagram of operation to identify a multi-hop network data path with sufficient available resources at each node along the data path to facilitate a desired end-to-end data flow according to an embodiment. At block 201 of the illustrated embodiment resource constraint information is propagated within the network for use in identifying data paths suitable for supporting a desired end-to-end data flow. For example, QoS information may be propagated to various network nodes throughout the network (e.g., network nodes N0-N5) by a QoS aware routing protocol. QoS information propagated to network nodes may include, but is not limited to, required application throughput, delay bound, jitter, tolerable residual packet loss rate, etc. The propagation of such resource constraint information according to embodiments of the disclosure facilitates operation in a distributed way to determine whether the resource availabilities at each node of an end-to-end data path are able to meet the communication requirements of an end-to-end data flow.

At block 202 of the illustrated embodiment, it is determined whether the resource availabilities at each node of an end-to-end data path are able to meet the communication requirements of an end-to-end data flow. One or more sets of network nodes, with their corresponding links, may be identified as providing an end-to-end data path between a source and destination for which an end-to-end data flow is desired. The resource availabilities at each node of such a set of network nodes may be analyzed with respect to the resource constraint information for the desired end-to-end data flow to determine whether the resource availabilities at each node of that particular end-to-end data path are able to meet the communication requirements of the desired end-to-end data flow. For example, in a TDMA system configuration, communication requirements such as QoS requirements may dictate minimum throughput metrics resulting in time slot (resource) constraints to be imposed with respect to each node used in a particular multi-hop data path. Embodiments analyze such information to identify resource constraints for meeting QoS or other communication requirements at each node of a multi-hop data path. For example, embodiments of the disclosure operate to select a particular multi-hop data path with sufficient available time slots at each node along the data path to accommodate the end-to-end data flow.

The foregoing analysis of resource availabilities at each node of a set of network nodes is repeated according to embodiments to determine whether the resource availabilities at each node of each set of network nodes (or at least a plurality of sets of network nodes) providing an end-to-end data path between the source and destination are able to meet the communication requirements of the desired end-to-end data flow. Accordingly, operation according to block 202 of embodiments of the disclosure may determine that a plurality of end-to-end paths meet an end-to-end data flow communication requirements.

A data flow between a source and destination at an intermediate node of an end-to-end data path utilizes corresponding upstream and downstream links. Accordingly, it is possible that the resource requirements of the desired end-to-end data flow may not be met for the upstream link or downstream link at each intermediate node or for the upstream link and downstream link simultaneously. Such scenarios provide a data path which is determined not to support a desired end-to-end data flow according to operation at block 202 of embodiments of the disclosure. Where the resource requirements for the desired end-to-end data flow are met at each intermediate node for the upstream and downstream links and also both links simultaneously, operation at block 202 of embodiments of the disclosure determine the data path will support a desired end-to-end data flow.

At block 203 of the illustrated embodiment an end-to-end data path able to meet the communication requirements of an end-to-end data flow is selected and resources are allocated with respect to network nodes, and their associated links, of the end-to-end data path. Where a plurality of end-to-end data paths (e.g., different sets of network nodes) are determined to comprise resource availabilities at each node able to meet the communication requirements of an end-to-end data flow at block 202, operation at block 203 may analyze potential resource allocations with respect to such end-to-end data paths for selecting a best end-to-end data path for use in providing a desired end-to-end data flow. For example, possible resource allocations with respect to the end-to-end data flows may be analyzed to determine an end-to-end data path and resource allocation combination which minimizes a total number of resources (e.g., time slots) used for the end-to-end data flow, which leaves a maximum number of resources (e.g., time slots) remaining at substantially all nodes in the end-to-end data path (e.g., to increase chances of new flows being admitted into the network with the QoS requirements being satisfied), etc. Additional or alternative analysis may be utilized in selecting a particular end-to-end data path, such as the available power in the network nodes of the end-to-end data path (e.g., to ensure route availability for a longer time in the absence of other factors).

Embodiments of the disclosure may operate to select a plurality of end-to-end data paths for use with respect to a desired end-to-end data flow. For example, rather than select a single "best" end-to-end data path, embodiments of the disclosure may select two or more end-to-end data paths able to meet the communication requirements of the desired end-to-end data flow, such as to provide robust routing, such as for communication fault tolerance.

Arbitrary resource allocation between the upstream and downstream links at each intermediate node may not satisfy QoS or other communication requirements of the links. Accordingly, operation at block 203 according to embodiments of the disclosure allocates resources to achieve an end-to-end data flow meeting the communication requirements, such as through use of a resource allocation algorithm.

For example, all intermediate nodes of an end-to-end data path are determined to have sufficient resource availability for a desired end-to-end data flow in a TDMA system configuration, and thus the data path may be identified as supporting the desired end-to-end data flow. However, arbitrary assignment of time slots in the upstream and downstream links may result in communication requirements not being met. A time slot allocation algorithm of embodiments of the disclosure may thus operate to allocate time slots to achieve end-to-end data flow meeting the communication requirements.

From the above it can be seen that operation at block 203 of embodiments ensures efficient use of the available resources so that desired conditions are satisfied when the resource requirements are met at each intermediate node for the upstream and downstream links and also both links simultaneously. Accordingly, embodiments of the disclosure are utilized in association with, or as part of, a communication requirements aware routing protocol, such as a QoS aware routing protocol.

It should be appreciated that the foregoing discussion of FIG. 2 describes operation in accordance with embodiments of the disclosure at a high level. Further detail with respect to providing operation in accordance with the concepts of the present disclosure is provided below.

In providing operation to determine whether the resource availabilities at each node of an end-to-end data path are able to meet the communication requirements of an end-to-end data flow according to embodiments of the invention, let N be the number of nodes in the end-to-end data path from a source to a destination (e.g., N=6 in the end-to-end data path illustrated in FIG. 1) and n(L) be the number of links in the end-to-end data path (e.g., n(L)=5 in the end-to-end data path illustrated in FIG. 1). Therefore, $$n(L)=N-1 \quad (1)$$

Let $L_{ij}$ be the link between nodes $N_i$ and $N_j$, $R_{app}$ be the bandwidth required (per link), $R_{ij}$ be the physical layer (PHY) rate that can be supported for link $L_{ij}$, and $p_{ij}$ be the corresponding physical layer packet error rate (PER) for link $L_{ij}$.

Figure 3:
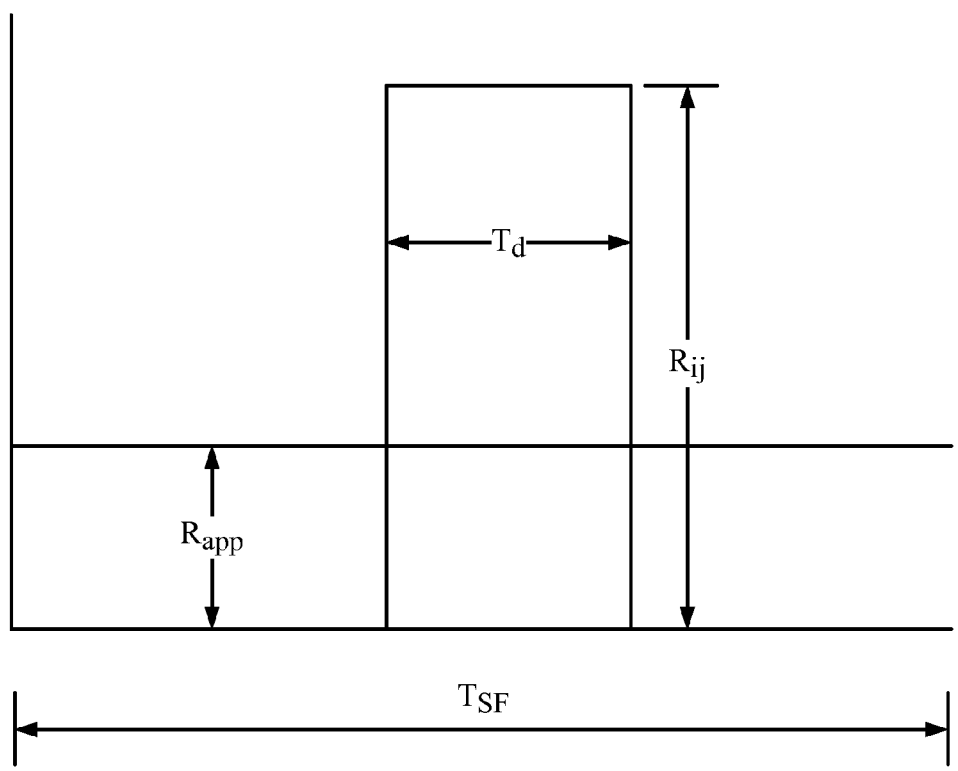
FIG. 3 illustrates relationships between the bandwidth required, the PHY rate, and data flow frame and slot durations of a TDMA system configuration.

FIG. 3 graphically illustrates relationships between the bandwidth required ($R_{app}$), the PHY rate ($R_{ij}$), and data flow frame and slot durations of a TDMA system configuration, such as may be utilized with respect to WiMedia UWB networks. In FIG. 3, $T_{SF}$ is the WiMedia superframe duration and $T_d$ is the total duration of reservation and hence depends on the number of medium access slots (MASs).

From the foregoing, $$R_{app} \times T_{SF} = R_{ij} \times T_d \times (1-p_{ij}) \times \eta \quad (2)$$

Where $\eta$ is the MAC efficiency for link $L_{ij}$ (i.e., proportion of time of payload transmission). Solving for $T_d$ gives $$T_d = \frac{R_{app} \times T_{SF}}{R_{ij} \times (1-p_{ij}) \times \eta} \quad (3)$$

Thus, the number of MASs needed for link $L_{ij}$ is given by $$N_{MAS,ij} = \frac{T_d}{T_{MAS}} = \frac{R_{app} \times T_{SF}}{R_{ij} \times (1-p_{ij}) \times \eta \times T_{MAS}} = \frac{256 R_{app}}{R_{ij} \times (1-p_{ij}) \times \eta} \quad (4)$$

It is assumed in the forgoing that $T_{SF}=256 T_{MAS}$. It should be appreciated that equation (4) provides a formula setting forth the number of slots needed for each of the intermediate network nodes of an end-to-end data path to support that hop of the desired end-to-end data flow.

In order to estimate the MAC efficiency, $\eta$, two examples are considered below. The first example considers the MAC efficiency associated with flows employing immediate acknowledgement (I-ACK) communication techniques and the second example considers the MAC efficiency associated with flows employing block acknowledgement (B-ACK) communication techniques, such as may be implemented in WiMedia UWB networks.

Figure 4:
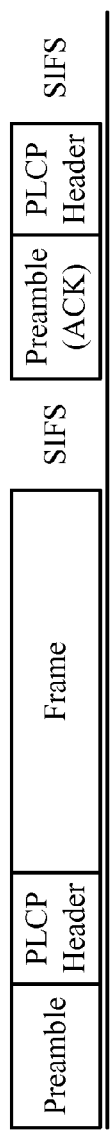
FIG. 4 shows a data packet structure for an I-ACK communication technique.

FIG. 4 shows a data transaction sequence for an I-ACK acknowledgement policy. The data packet structure of FIG. 4 comprises a first physical layer convergence protocol (PLCP) preamble, a first PLCP header, a payload frame, a short interframe space (SIFS), a second (ACK) PLCP preamble, a second (ACK) PLCP header, and a second (ACK) SIFS. Where the PLCP preambles are 9.375 us in duration, the PLCP headers are 3.75 us in duration, and the SIFSs are 10 us in duration (as may be the case for a WiMedia UWB network configuration), the total overhead for the data packet structure of FIG. 4 is 46.25 us. Thus, assuming a 4096 octet physical layer service data unit (PSDU) transmission at 480 Mbps, the transfer duration is 69.375 us and the MAC efficiency, $\eta$, is 0.6. Assuming a 512 octet PSDU transmission at 53.3 Mbps, the transfer duration is 76.875 us and the MAC efficiency, $\eta$, is 0.624.

Figure 5:
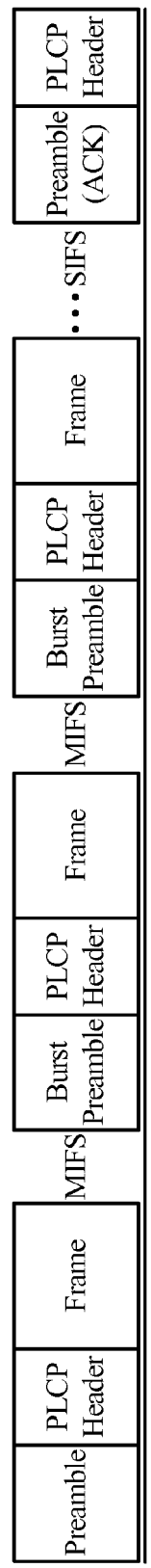
FIG. 5 shows a data packet structure for an B-ACK communication technique.

Referring now to FIG. 5, a data transaction sequence for a B-ACK acknowledgement policy is shown. The data packet structure of FIG. 5 comprises a first PLCP preamble, a first PLCP header, a payload frame, a plurality of minimum interframe space (MIFSs), a plurality of burst preambles, a plurality of PLCP headers, a plurality of payload frames, a SIFS, a second (B-ACK) PLCP preamble, a second (B-ACK) PLCP header, a second (B-ACK) SIFS, and the B-ACK body. For example, assume a case where a burst mode is used with burst preamble and 8 bursts. The first PLCP preamble, PLCP header, and payload frame are followed by 7 bursts each consisting of a MIFS, a burst preamble, a PLCP header, a payload frame, a SIFS, an ACK PLCP preamble, an ACK PLCP header, and an ACK SIFS. Where the first PLCP preamble is 9.375 us in duration, the $2^{nd}$-$8^{th}$ PLCP preambles are 5.625 us in duration each, the eight PLCP headers are 3.75 us in duration each, the MIFSs are 1.875 us in duration each, the SIFSs are 10 us in duration, and the B-ACK is 1.875 us in duration (as may be the case for a WiMedia UWB network configuration), the total overhead for the data packet structure of FIG. 4 is 126.875 us. Thus, assuming a 4096 octet PSDU transmission at 480 Mbps, the transfer duration is 555 us and the MAC efficiency, $\eta$, is 0.814.

From the above, it can be seen that for most scenarios, $$0.6 \leq \eta \leq 0.85 \quad (5)$$

Taking a conservative estimate of average MAC efficiency, $\eta=0.7$ and solving equation (4) using this average MAC efficiency value gives $$N_{MAS,ij} = \frac{256 R_{app}}{R_{ij} \times (1-p_{ij}) \times \eta} \sim \frac{365 R_{app}}{R_{ij} \times (1-p_{ij})} \quad (6)$$

Assuming $$N_{MAS,ij} < 256 \quad (7)$$

then $$R_{app} < R_{ij} \times (1-p_{ij}) \times \eta = 0.7 R_{ij} \times (1-p_{ij}) \quad (8)$$

Equations (6) and (8) should be satisfied for each hop of the end-to-end path if the resource availabilities at each node of each set of network nodes providing an end-to-end data path between the source and destination are able to meet the communication requirements of the desired end-to-end data flow.

Let $x_{i,k}$ represent the kth MAS availability of node i. Thus, $x_{i,k}=1$ if the kth MAS is available for node $i$; and $x_{i,k}=0$ if the kth MAS is unavailable for node $i$ \quad (9)

Similarly, let $x_{j,k}$ represent the kth MAS availability of node j.

Let $S_{ij,k}$ represent the kth MAS availability for link $L_{ij}$ between nodes i and j. Thus, $S_{ij,k}=1$ if $x_{i,k}=1$ and $x_{j,k}=1$; otherwise $$S=0 \quad (10)$$

Assume $$S_{ij} = \sum_k S_{ij,k}$$

represents the number of MASs available for link $L_{ij}$ at both nodes i and j. Therefore, $$S_{ij} = \sum_k S_{ij,k} \geq N_{MAS,ij} \quad (11)$$

All network nodes in the end-to-end data path, except the source and destination network nodes, should support two simultaneous reservations. Specifically, these network nodes should simultaneously support one reservation as reservation target and another reservation as reservation owner. Thus, considering two links, $L_{ij}$ between nodes i and j and $L_{jh}$ between nodes j and h, $$S_{jh} = \sum_k S_{jh,k} \geq N_{MAS,jh} \qquad (12)$$

The total number of available MASs at intermediate node j should satisfy the following $$n(S_{ij} \cup S_{jh}) \geq N_{MAS,ij} + N_{MAS,jh} \qquad (13)$$

The MASs considered for the first reservation are unavailable for the second reservation. Thus, the MASs at each link do not interfere with each other.

Equations (11), (12), and (13) express a set of resource constraints which are to be satisfied for each intermediate network node in an end-to-end data flow if a desired end-to-end data flow is to be supported. Accordingly, in addition to satisfying equations (6) and (8) above, equations (11), (12), and (13) each should be satisfied at the intermediate node j to support both reservations and hence the desired end-to-end data flow. If only one of equations (11) and (12) is satisfied, it implies that only one reservation can be supported and not the other. If both equations (11) and (12) are satisfied but equation (13) is not satisfied, then both the reservations can be supported in a stand-alone basis but two simultaneous reservations, and thus the desired end-to-end data flow, cannot be supported. If nodes i and/or h are also intermediate nodes, the same feasibility checks are also to be carried out at those nodes.

In operation according to embodiments, network nodes send a list of MASs that it sees as available for itself in the 2 hop neighborhood. For example, in operation according to the ECMA-368 specification, the distributed reservation protocol (DRP) availability information element (IE) may be used by network nodes to indicate its view of the current utilization of MASs by sending a list of available MASs in the DRP Availability IE in beacon frames. Using such information, network nodes in the end-to-end data path are able to evaluate whether the resource constraints (e.g., as set forth in equations (11), (12), and (13)) are satisfied.

Even when, all three of equations (11), (12), and (13) are individually satisfied, arbitrary allocation of slots between two reservations on $L_{ij}$ and $L_{jh}$ may not satisfy the requirements of both reservations. The resource allocation method illustrated in FIG. 6 is utilized according to embodiments of the disclosure to ensure that allocation of slots between two reservations on $L_{ij}$ and $L_{jh}$ satisfies the requirements of both reservations.

Figure 6:
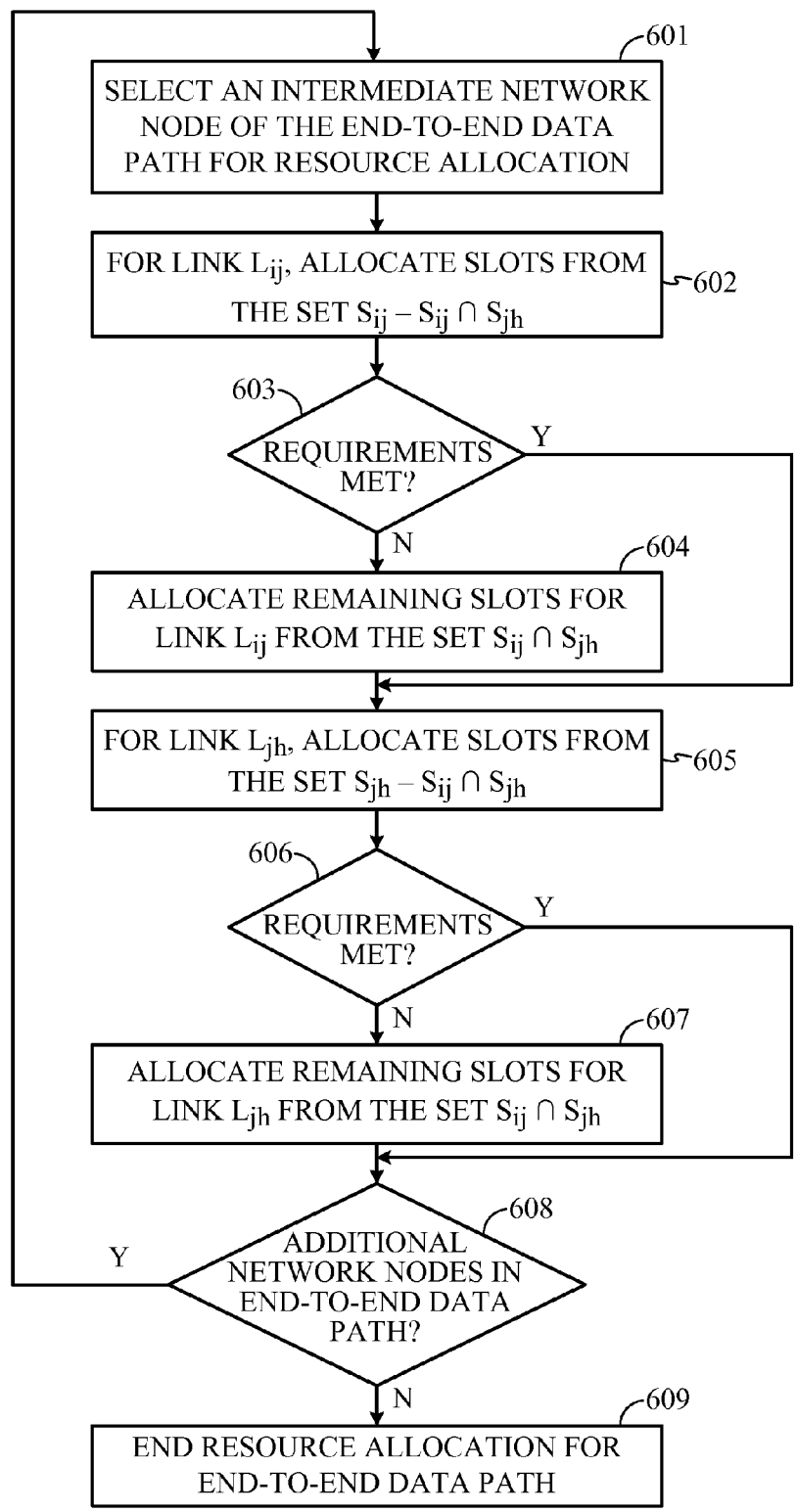
FIG. 6 shows a flow diagram of resource allocation according to embodiments of the disclosure.

At block 601 of the embodiment illustrated in FIG. 6 an intermediate network node of an end-to-end data path identified as having sufficient resources available to support the desired end-to-end data flow is selected for resource allocation. At block 602, slots from the set $S_{ij} - S_{ij} \cap S_{jh}$ are allocated for link $L_{ij}$ of the selected network node. If it is determined at block 603 that the communication requirement for link $L_{ij}$ is met by the slots allocated in block 602, allocation with respect to link $L_{ij}$ is completed and processing according to the illustrated embodiment proceeds to block 605. If, however, it is determined at block 603 that the communication requirement for link $L_{ij}$ is not met by the slots allocated in block 602, processing proceeds to block 604 for additional slot allocation with respect to link $L_{ij}$. At block 604 remaining slots for link $L_{ij}$ are allocated from the set $S_{ij} \cap S_{jh}$.

At block 605, slots from the set $S_{jh} - S_{ij} \cap S_{jh}$ are allocated for link $L_{jh}$ of the selected network node. If it is determined at block 606 that the communication requirement for link $L_{jh}$ is met by the slots allocated in block 605, allocation with respect to link $L_{jh}$ is completed and processing according to the illustrated embodiment proceeds to block 608. If, however, it is determined at block 606 that the communication requirement for link $L_{jh}$ is not met by the slots allocated in block 605, processing proceeds to block 607 for additional slot allocation with respect to link $L_{jh}$. At block 607 remaining slots for link $L_{jh}$ are allocated from the set $S_{ij} \cap S_{jh}$.

At block 608 a determination is made as to whether additional intermediate network nodes are present in the end-to-end data path for resource allocation. If there are additional intermediate network nodes, processing according to the illustrated embodiment returns to block 601 for selection of another intermediate network node. If there are no additional intermediate network nodes, processing according to the illustrated embodiment proceeds to block 609 wherein resource allocation for the end-to-end data path is ended.

To further illustrate operation in accordance with the foregoing, let, $N_{MAS,ij} = 10$, $N_{MAS,jh} = 8$, $n(S_{ij}) = 12$, $n(S_{jh}) = 8$, and $n(S_{ij} \cap S_{jh}) = 2$. Therefore, $n(S_{ij} \cup S_{jh}) = 12 + 8 - 2 = 18$. Each of equations (11), (12), and (13) are satisfied. However, if 10 slots for link $L_{ij}$ are allocated such that one or two slots are from $S_{ij} \cap S_{jh}$, then the slot requirement for link $L_{jh}$ cannot be satisfied. The slot allocation method illustrated in FIG. 6 increases the likelihood of achieving the goals of the desired end-to-end data flow and/or may be utilized in selecting a particular end-to-end data path for use in providing a desired end-to-end data flow where a plurality of end-to-end data paths may provide resource availability at each node to meet the communication requirements of the desired end-to-end data flow.

Embodiments of the disclosure additionally or alternatively operate to select a particular end-to-end data path of a plurality of end-to-end data paths having a resource allocation meeting the communication requirements which will utilize a minimum total number of MASs over all links of the end-to-end data path because minimizing total number of MASs is equivalent to minimizing air time. The total number of MASs over all links, $N_{Total}$, is given by $$NTotal = \sum_{L_{ij}} \frac{2 \times 256 R_{app}}{R_{ij} \times (1 - p_{ij}) \times \eta} \qquad (14)$$

Assuming same MAC efficiency over all the links, the following equation should be minimized $$\sum_{L_{ij}} \frac{1}{R_{ij} \times (1 - p_{ij})} = \sum_{L_{if}} \frac{1}{R'_{ij}} \qquad (15)$$

where $R'_{ij} = R_{ij} \times (1 - p_{ij})$ in order to select a best end-to-end data path from the plurality of end-to-end data paths meeting the communication requirements of the desired end-to-end data flow.

The methodologies described herein may be implemented by various components depending upon the application. For example, these methodologies may be implemented in hardware, firmware, software, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processor unit. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read only memory (ROM), electrically erasable programmable read only memory (EEPROM), compact disk read only memory (CD-ROM) or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Figure 7:
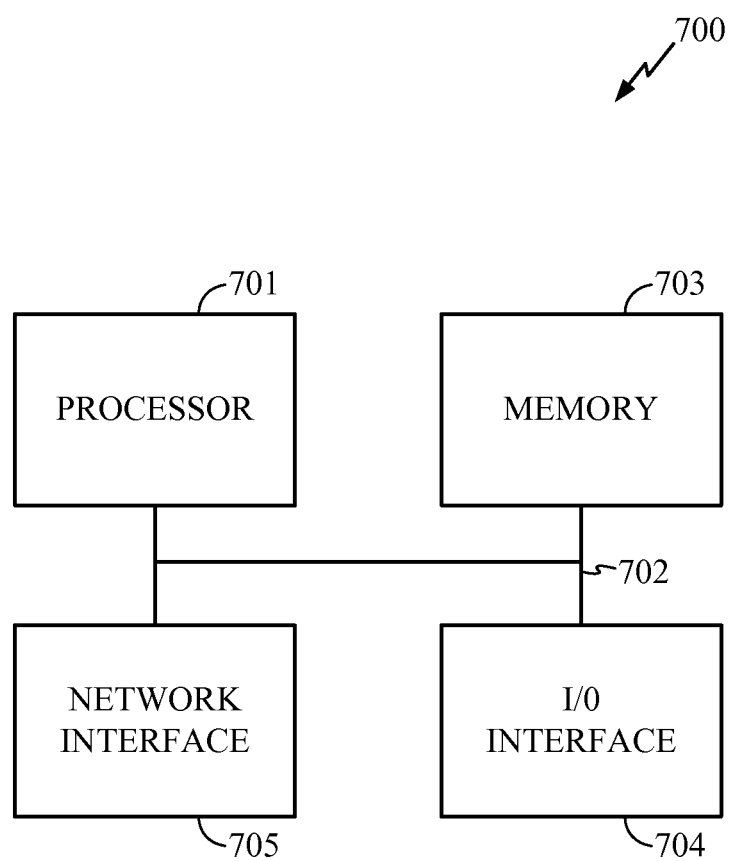
FIG. 7 shows a processor based system adapted according to embodiments of the disclosure.

FIG. 7 illustrates processor based system 700 adapted in accordance with the present disclosure to provide operation as described herein under control of the aforementioned code segments. Processor based system 700 may comprise a network node, such as any of network nodes N0-N5 of FIG. 1, or a system coupled to one or more network node. Processor 701 is coupled to system bus 702. Processor 701 may comprise a general purpose central processing unit (CPU), such as PENTIUM processor available from Intel Corporation, or a special purpose processor, such as an application specific integrated circuit (ASIC), programmable gate array (PGA), etc. However, the present disclosure is not restricted by the architecture of processor 701 as long as processor 701 supports the inventive operations as described herein. Bus 702 is coupled to memory 703, which may comprise any suitable computer readable medium such as RAM, ROM, flash memory, optical memory, magnetic memory, etc. Memory 703 stores user data, system data, resource constraint information, program code, etc. to facilitate operation as described herein. Bus 702 is also coupled to input/output (I/O) interface 704 and network interface 705. I/O interface 704 provides interfacing of various peripherals, components, devices, etc., such as may comprise keyboards, keypads, pointing devices, display devices, etc. Thus, I/O interface 704 may comprise a plurality of individual interfaces, interface protocols, etc. Network interface 705 provides interfacing with one or more network links, such as may comprise one or more wireline links, wireless links, fiber optic links, etc. Thus network interface 705 may comprise a single network interface or a plurality of network interfaces operating in accordance with one or more network protocols.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of selecting an end-to-end data path between a source node and a destination node in a distributed multi-hop time division multiple access (TDMA) network, the method comprising:
   identifying at the source node a plurality of end-to-end data paths, each identified end-to-end data path comprising a number of intermediate nodes between the source node and the destination node, each intermediate node having sufficient available resources to guarantee a quality of service (QoS) associated with an end-to-end data flow;
   determining at the source node that at least one of the identified end-to-end data paths minimizes a total number of time slots at the intermediate nodes between the source node and the destination node assigned to the end-to-end flow; and
   selecting at the source node the at least one end-to-end data path to implement the end-to-end data flow.

2. The method of claim 1, in which the selecting comprises selecting a plurality of end-to-end data paths to implement the end-to-end flow.

3. The method of claim 1, further comprising:
   analyzing time slot allocation with respect to the plurality of end-to-end data paths to determine a total number of time slots that would be used for the desired end-to-end data flow, wherein the selected at least one end-to-end data path comprises at least the total number of time slots determined by the analysis.

4. The method of claim 1, further comprising:
   analyzing time slot allocation with respect to the plurality of end-to-end data paths;
   wherein the selected at least one end-to-end data path maximizes a number of unallocated time slots remaining at the intermediate nodes used for the end-to-end data flow.

5. The method of claim 1, further comprising: allocating time slots between upstream and downstream links at each intermediate node of the selected end-to-end data path to satisfy QoS requirements of the desired end-to-end data flow.

6. The method of claim 1, wherein the selecting the at least one of the identified end-to-end paths further comprises:
selecting the at least one of the identified end-to-end data paths based at least partly on a number of slots remaining at the intermediate nodes in the selected at least one end-to-end data path.

7. The method of claim 1, wherein the selecting the at least one of the identified end-to-end data paths further comprises:
selecting the at least one of the identified end-to-end data paths based at least partly on a power consumption of the intermediate nodes in the selected at least one end-to-end data path.

8. A method for providing an end-to-end data flow between a source node and a destination node in a network, the method comprising:
propagating resource constraint information from the source node to a plurality of intermediate nodes between the source node and the destination node of the network;
receiving at the source node resource constraint information and a resource availability of each intermediate node in at least one end-to-end data path, the resource availability comprising available time slots at each intermediate node;
determining at the source node using the received resource constraint information and resource availability of each intermediate node in at least one end-to-end data path whether each intermediate node of the at least one end-to-end data path is able to support a communication attribute of the end-to-end data flow;
selecting at the source node an end-to-end data path of the at least one end-to-end data path based on a determination that each intermediate node of the selected end-to-end data path comprises resource availability to support the communication attribute of the end-to-end data flow; and
allocating communication resources for each intermediate node of the selected end-to-end data path to provide the end-to-end data flow with the communication attribute.

9. The method of claim 8, wherein the communication attribute comprises a quality of service (QoS) level.

10. The method of claim 8, wherein the selected end-to-end data path minimizes a total number of communication resources assigned to the end-to-end data flow.

11. The method of claim 10, wherein the communication resources comprise time slots of a time division multiple access (TDMA) network communication protocol.

12. The method of claim 8, wherein the selecting an end-to end data path comprises selecting a plurality of end-to-end data paths for providing the end-to-end data flow.

13. The method of claim 8, wherein the selecting an end-to-end data path comprises:
analyzing communication resource allocation with respect to at least one end-to-end data path to determine a total number of communication resources that would be used for the end-to-end data flow and selecting an end-to-end data path and resource allocation comprising at least the total number of communication resources used for the desired end-to-end data flow.

14. The method of claim 8, wherein the selecting an end-to-end data path comprises: analyzing communication resource allocation with respect to the at least one end-to-end data path; wherein the selected end-to-end data path maximizes a number of unallocated communication resources remaining at the intermediate nodes used for the end-to-end data flow.

15. The method of claim 8, wherein the allocating communication resources comprises: allocating communication resources between upstream and downstream links at each intermediate node of the selected end-to-end data path to satisfy the communication attribute of the end-to-end data flow.

16. The method of claim 8, wherein the allocating communication resources comprises:
for an intermediate network node of the selected end-to-end data path;
allocating communication resources for an upstream link associated with the intermediate network node from a first set of communication resources, the first set of communications resources comprising resources available to the intermediate network node and an upstream network node which are not available at a downstream network node;
if the first set of communication resources does not satisfy upstream requirements, allocating communication resources for the upstream link associated with the intermediate network node from a second set of communication resources, the second set of communications resources comprising resources available to the intermediate network node, the upstream network node, and the downstream network node;
allocating communication resources for a downstream link associated with the intermediate network node from a third set of communication resources, the third set of communications resources comprising resources available to the intermediate network node and the downstream network node which are not available at the upstream network node; and
if the third set of communication resources does not satisfy downstream requirements, allocating communication resources for the downstream link associated with the intermediate network node from the second set of communication resources.

17. The method of claim 8, wherein the selecting the end-to-end data path is based at least partly on a power consumption of the intermediate nodes in the selected end-to-end data path.

18. A system for providing an end-to-end data flow between a source node and a destination node in a network, the system comprising:
a memory communicatively coupled with a processor, the processor configured to execute code stored by the memory to:
determine at the source node, using resource constraint information received from a plurality of intermediate nodes of the network between the source node and the destination node, whether a resource availability at each intermediate node of at least one end-to-end data flow, the resource constraint information comprising available time slots at each intermediate node
select at the source node an end-to-end data path of the at least one end-to-end data path based on a determination that each intermediate node of the selected end-to-end data path comprises resource availability to support the communication attribute of the end-to-end data flow; and
allocate communication resources for each intermediate node of the selected end-to-end data path to provide the end-to-end data flow with the communication attribute.

19. The system of claim 18, wherein the allocated resources comprise time slots of a time division multiple access (TDMA) network communication protocol, and wherein the resource constraint information comprises information regarding the availability of time slots of the TDMA communication protocol.

20. A system for providing an end-to-end data flow between a source node and a destination node in a network, the system comprising:
   means for determining at the source node, using resource constraint information received from a plurality of intermediate nodes of the network between the source node and the destination node, whether resource availability at each intermediate node of at least one end-to-end data path in the network is able to support a communication attribute of the end-to-end data flow, the resource constraint information comprising available time slots at each intermediate node;
   means for selecting at the source node an end-to-end data path of the at least one end-to-end data path based on a determination that each intermediate node of the selected end-to-end data path comprises resource availability to support the communication attribute of the end-to-end data flow; and
   means for allocating communication resources for each intermediate node of the selected end-to-end data path to provide the end-to-end data flow with the communication attribute.

21. The system of claim 20, further comprising:
   means for propagating the resource constraint information to the nodes of the network.

22. The system of claim 20, wherein the communication resources comprise time slots of a time division multiple access (TDMA) network communication protocol, and wherein the resource constraint information comprises information regarding the availability of time slots of the TDMA communication protocol.

23. A computer program product for providing an end-to-end data flow between a source node and a destination node in a network, the computer program product comprising:
   a computer readable storage device storing computer executable code, the computer executable code including:
      code for determining at the source node, using resource constraint information received from a plurality of intermediate nodes of the network between the source node and the destination node, whether a resource availability at each intermediate node of at least one end-to-end data path in the network is able to support a communication attribute of the end-to-end data flow, the resource constraint information comprising available time slots at each intermediate node;
      code for selecting at the source node an end-to-end data path of the at least one end-to-end data path based on a determination that each intermediate node of the selected end-to-end data path comprises resource availability to support the communication attribute of the end-to-end data flow; and
      code for allocating communication resources for each intermediate node of the selected end-to-end data path to provide the end-to-end data flow with the communication attribute.

24. The computer program product of claim 23, wherein the selected end-to-end data path minimizes a total number of communication resources assigned to the end-to-end data flow.

25. The computer program product of claim 23, wherein the code for selecting the end-to-end data path comprises:
   code for analyzing communication resource allocation with respect to at least one end-to-end data path;
   code for determining a total number of communication resources that would be used for the end-to-end data flow based at least in part on information from the code for analyzing; and
   code for selecting an end-to-end data path and resource allocation comprising at least the total number of communication resources used for the desired end-to-end data flow.

26. The computer program product of claim 23, wherein the code for selecting the end-to-end data path comprises:
   code for analyzing communication resource allocation with respect to the at least one end-to-end data path;
   wherein the selected end-to-end data path maximizes a number of unallocated communication resources remaining at the nodes used for the end-to-end data flow.

27. The computer program product of claim 23, wherein the code for allocating communication resources comprises:
   code for allocating communication resources for an upstream link associated with an intermediate network node from a first set of communication resources, the third set of communications resources comprising resources available to the intermediate network node and an upstream network node which are not available at a downstream network node, wherein if the first set of communication resources does not satisfy upstream requirements, the code for allocating allocates communication resources for the upstream link associated with the intermediate network node from a second set of communication resources, the second set of communications resources comprising resources available to the intermediate network node, the upstream network node, and the downstream network node; and
   code for allocating communication resources for a downstream link associated with the intermediate network node from a third set of communication resources, the third set of communications resources comprising resources available to the intermediate network node and the downstream network node which are not available at the upstream network node, wherein if the third set of communication resources does not satisfy downstream requirements for the downstream link, the code for allocating allocates communication resources for the downstream link associated with the intermediate network node from the second set of communication resources.

* * * * *